Aug. 10, 1926. 1,595,529
Y. TAKAYAMA
PROCESS OF SEPARATING AND COLLECTING ORGANIC ACIDS AND BASES
FROM BEETROOT MOLASSES
Filed June 30, 1924
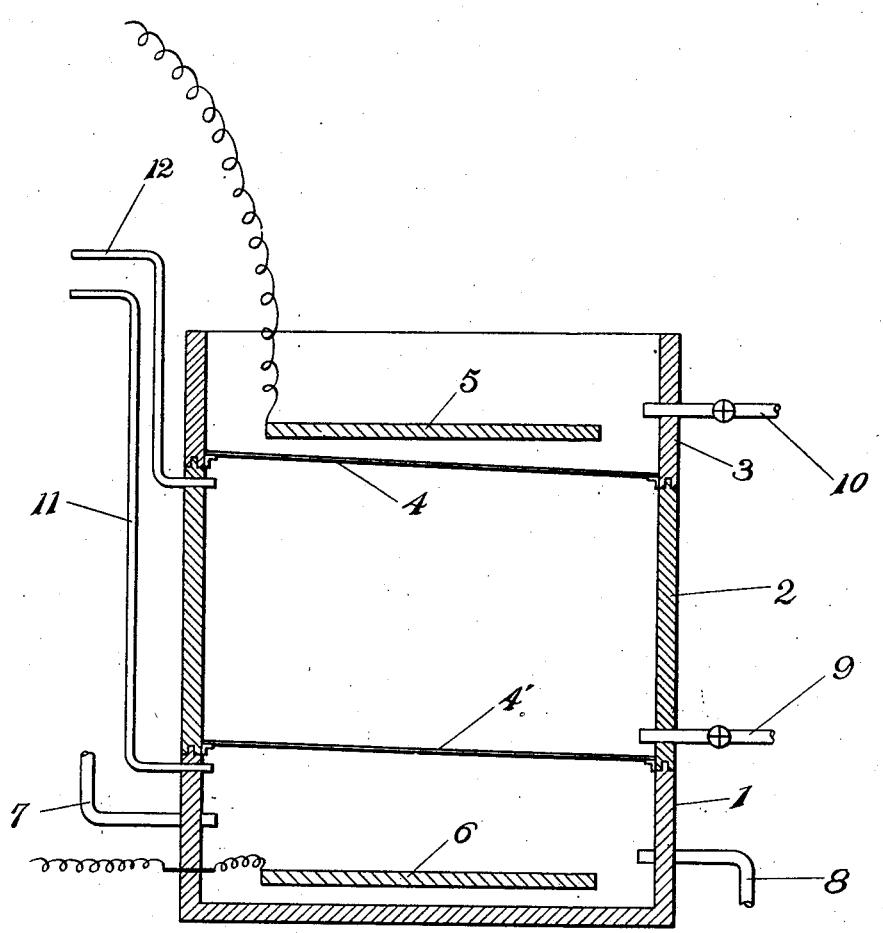

Patented Aug. 10, 1926.

1,595,529

UNITED STATES PATENT OFFICE.

YOSHITARO TAKAYAMA, OF TOKYO, JAPAN.

PROCESS OF SEPARATING AND COLLECTING ORGANIC ACIDS AND BASES FROM BEET-ROOT MOLASSES.

Application filed June 30, 1924. Serial No. 723,421.

This invention relates to a process of separating and collecting organic acids, such as glutamic acid, glutimic acid, succinic acid, &c., and bases, such as betaine, alkali, potassium, &c., existing in the free state or in compounds, by electrolyzing beetroot molasses or the residue or dregs remaining after fermentation and distilling of the molasses, and the object thereof is to recover by a simple process and means useful substances from such waste material.

The accompanying drawing shows diagrammatically one form of means for carrying out my invention, the figure being a vertical section through the apparatus.

While studying the composition of beetroot molasses and the fermentation residue or dregs thereof, I have found that the above contain comparatively large proportions of glutamic acid, glutimic acid (pyrrolidone-carboxylic acid), succinic acid, betaine, potassium caustic potash, &c., in free and combined states, and my invention is a novel process and means for separating and recovering these components by subjecting the beetroot molasses, or fermentation residue thereof, to electrolysis, thereby causing the bases to collect near the cathode, and the organic acids, in free state or combined with anode metals, near the anode.

In order to carry out my invention, make a trough of suitable material such as wood sealing the joints so that there is no leakage. Subdivide the trough by partitions (4) and (4') of suitable permeable material such as parchment paper into a bottom chamber (1), middle chamber (2) and upper chamber (3). The partitions (4) and (4') are preferably slightly inclined, as shown. In the upper chamber (3) place a cathode (5) of a material which will resist the action of alkali, such as iron, carbon, or the like, and in the bottom chamber (1) place an anode (6) of a metal which will form a soluble salt of an organic acid, such as iron, zinc, aluminium, or the like. On the side of the trough adjacent the higher ends of the partitions (4) and (4'), just below the partitions, provide pipes (12) and (11) adapted to lead away the gases that are evolved while electrolysis is going on. Into the bottom chamber (1), lead a pipe (7) for pouring in fresh water and a pipe (8) for draining the liquid remaining in the chamber after the electrolyte has been decomposed. Into the middle chamber (2) lead a pipe (9) for feeding electrolyte thereinto, and into the upper or cathode chamber (3) lead a pipe (10) for draining off the liquid remaining after decomposition of the electrolyte, thus making the apparatus capable of carrying on the process continuously.

Now, charge the trough with beetroot molasses, or the residue of beetroot molasses after alcoholic fermentation and distillation of the alcohol, and pass an electric current of from 10 to 0.1 amperes per square decimeter through the anode and cathode circuit. The caustic alkali, betaine, &c., will collect around the cathode (5), and the salts formed by glutamic acid, glutimic acid (i. e., pyrrolidonecarboxylic acid), succinic acid, &c., and the corroding anode metals, will collect around the anode (6). When the concentration of these salts considerably increases the salts will diffuse through the partitions into the middle chamber, and will be again electrically decomposed, which will decrease the current efficiency. In order to prevent this, fresh water is continually poured around the anode (6) and the anode liquid is continually drained off through the discharge pipe (8).

The alkaline solution around the cathode, that is, the fluid collecting around the cathode, contains principally potassium, caustic potash mixed with betaine and caustic soda.

It is very easy to separate betaine and potassium, and the following are a few examples thereof:

*Example 1.*—Neutralize the cathode fluid by adding thereto dilute sulphuric or hydrochloric acid, or by passing therethrough carbonic acid gas. After evaporating and concentrating the fluid, allow it to cool and separate therefrom potassium and soda as sulphate, chloride, or carbonate in crystal form. Then concentrate the mother liquor further and extract therefrom betaine in free state or as an ester by adding thereto alcohol.

*Example 2.*—Evaporate and concentrate the cathode fluid without beforehand separating therefrom the potassium and soda. Heat the cathode fluid in a closed vessel and separate the betaine by distillation converting it into tri-methylamine. The remainder may be neutralized with a mineral acid, and potassium and soda salts may be collected in crystal form.

The treatment of the anode fluid differs according to the kind of metal used as an electrode, and the following are a few examples:

*Example 1.*—When iron is used as the anode, a solution of sodium hydroxide, sodium carbonate, or calcium hydroxide may be added to the anode liquor, thus precipitating the iron. The liquor may then be filtered, and the filtered liquor is acidulated by adding thereto dilute hydrochloric or sulphuric acid. Then concentrate the liquor by heating, thereby converting the glutimic acid into glutamic acid. Hydrochloric acid or lime hydroxide may be added causing the glutamic acid to crystallize converting the same into a hydrochloride or dicalcium salt of glutamic acid. The crystals may then be separated, and by adding thereto sodium bicarbonate or carbonate, the glutamic acid or monosodium glutamate, may be collected. The mother liquor from which hydrochloride or calcium salt of glutamic acid was taken, may be further concentrated, and calcium succinate may then be collected in the shape of crystals.

*Example 2.*—When zinc is used as the anode, the zinc may be precipitated as zinc sulphide by passing into the anode liquor hydrogen sulphide, and then filtering same. The filtered liquor may then be treated just as in Example 1, and glutamic acid and succinic acid will be collected.

*Example 3.*—Without separating the metal derived from the anode, hydrochloric acid or sulphuric acid may be directly added to the anode liquor. Then heat the liquor. After converting the glutimic acid into glutamic acid, cause the anode metal to precipitate as an hydroxide by adding alkali hydroxide, or as a sulphide by passing into the liquor hydrogen sulphide. After removing these precipitates, the liquor may be treated just as in Example No. 1, and glutamic acid and succinic acid will be collected.

*Example 4.*—In the above examples, after the metal derived from the anode is removed, calcium hydroxide may be directly added without converting the glutimic acid into glutamic acid. Heating the liquor will convert the organic acids contained therein into calcium salts. Then adding alcohol will cause the calcium glutamate and calcium glutimate to precipitate. The precipitates may then be washed with water and glutamate and glutimate will be collected. The mother liquor may be further heated and the alcohol will be recovered and from the remainder calcium succinate may be collected.

As described above, glutimic acid may be easily separated from the material by electrolysis. But in the case of using as material the residue remaining after distilling alcohol from fermented molasses, the material may first be treated with an inorganic acid, thus converting the glutimic acid into glutamic acid, and then the material may be separated by electrolysis into bases and organic acids.

I claim:

1. A process of recovering organic acids and bases from beetroot molasses, consisting in subjecting the same to electrolysis, and separating organic acids which collect around the anode, and bases which collect around the cathode.

2. A process of recovering organic acids and bases from distilled residue of beetroot molasses after alcoholic fermentation, consisting in subjecting the residue to electrolysis, and separating bases which collect around the cathode, and organic acids which collect around the anode.

3. A process of recovering organic acids and bases from distilled residue of beetroot molasses after alcoholic fermentation, consisting in subjecting the residue to electrolysis after treating the same with an inorganic acid, and separating bases which collect around the cathode, and organic acids which collect around the anode.

4. A process of recovering bases from beetroot molasses consisting in subjecting such molasses to electrolysis and separating from the cathode liquid alkali and betaine.

5. A process of recovering bases from the residue of fermented beetroot molasses after distilling alcohol therefrom, consisting in subjecting the same to electrolysis, and separating alkali and betaine from the cathode liquid.

6. A process of recovering organic acids from beetroot molasses consisting in subjecting the same to electrolysis, and separating from the anode liquid glutamic, glutimic, and succinic acids some in free state and some as salts.

7. A process of recovering organic acids from the residue of fermented beetroot molasses after distilling alcohol therefrom, consisting in subjecting the same to electrolysis, and separating glutamic, glutimic, and succinic acids from the anode liquid.

8. The process of recovering organic acids and bases from beetroot molasses, consisting in subjecting the same to electrolysis, and treating the anode liquid with an inorganic acid without first removing metallic salts therefrom, thereby converting the glutimic acid to glutamic acid; recovering the glutamic acid; and recovering succinic acid from the mother liquor.

9. A process for recovering organic acids and bases from distilled residue of beetroot molasses after alcoholic fermentation thereof, consisting in subjecting the same to electrolysis, and treating the anode liquid with an inorganic acid without first removing metallic salts from the liquid, thereby converting the glutimic acid to glutamic acid; recovering the glutamic acid; and recovering succinic acid from the mother liquor.

In testimony whereof I have affixed my signature.

YOSHITARO TAKAYAMA.